US012700384B2

(12) United States Patent
Wang

(10) Patent No.: US 12,700,384 B2
(45) Date of Patent: Aug. 4, 2026

(54) ELECTRONIC DEVICE, COMPUTER-READABLE STORAGE MEDIUM AND RENDERING METHOD FOR RENDERING A WINDOW AT VARYING QUALITIES

(71) Applicant: MediaTek Singapore Pte. Ltd., Singapore (SG)

(72) Inventor: Huqing Wang, Chengdu (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 19/063,572

(22) Filed: Feb. 26, 2025

(65) Prior Publication Data

US 2025/0279079 A1 Sep. 4, 2025

(30) Foreign Application Priority Data

Mar. 1, 2024 (CN) ......................... 202410238565.7

(51) Int. Cl.
*G09G 5/391* (2006.01)

(52) U.S. Cl.
CPC ..... *G09G 5/391* (2013.01); *G09G 2340/0407* (2013.01)

(58) Field of Classification Search
CPC ..................................................... G09G 5/391
See application file for complete search history.

(56) References Cited

U.S. PATENT DOCUMENTS

2003/0076340 A1 * 4/2003 Hatori ..................... G09G 5/14
345/699
2005/0264589 A1 * 12/2005 Kimoto .................... G09G 5/14
345/698

* cited by examiner

*Primary Examiner* — Gustavo Polo
(74) *Attorney, Agent, or Firm* — McClure, Qualey & Rodack, LLP

(57) ABSTRACT

Rendering method and related devices are provided. The rendering method includes the following steps. The method includes determining whether to decrease the rendering quality of a first window based on the coordinates and/or the area of a region of the first window covered by a second window when at least a portion of the region of the first window is covered by the second window; and rendering the first window at a lower rendering quality upon confirmation that the rendering quality of the first window has been decreased. The present invention can reduce the power consumption of a device.

12 Claims, 1 Drawing Sheet

ELECTRONIC DEVICE, COMPUTER-READABLE STORAGE MEDIUM AND RENDERING METHOD FOR RENDERING A WINDOW AT VARYING QUALITIES

CROSS REFERENCE TO RELATED APPLICATIONS

This application claims priority of China Patent Application No. 202410238565.7, filed on Mar. 1, 2024, the entirety of which is incorporated by reference herein.

BACKGROUND OF THE INVENTION

Field of the Invention

The present invention relates to the field of display technology, and in particular it relates to a rendering method and related devices.

Description of the Related Art

In some scenarios, users may be primarily concerned about the performance or quality of the content of a single task (including windows and screens) on a device. In addition, all the tasks (including windows and screens) presented on the device in the relevant technology are designed to meet the standards for high performance and high quality, which results in a waste of power by the device.

BRIEF SUMMARY OF THE INVENTION

An embodiment of the present invention provides a rendering method and related devices that can reduce the power consumption of a device.

To achieve the above objective, the present invention provides a rendering method. The method comprises determining whether to decrease the rendering quality of a first window based on the coordinates and/or the area of a region of the first window covered by a second window when at least a portion of the region of the first window is covered by the second window; and rendering the first window at a lower rendering quality upon confirmation that the rendering quality of the first window has been decreased.

To achieve the above objective, the present invention further provides an electronic device comprising: a memory configured to store instructions/program data; and a processor coupled to the memory and configured to execute the instructions/program data to implement steps of the above rendering method.

To achieve the above objective, the present invention further provides a computer-readable storage medium comprising instructions/program data that, when executed, carries out the steps of the above rendering method.

The present invention in the case where at least a portion of the region of the first window is covered by the second window that whether to decrease the rendering quality of the first window based on the coordinates and/or the area of the region of the first window covered by the second window is to be determined. The first window is rendered at the lower rendering quality when it is determined that a decrease in the rendering quality of the first window is required. As such, in the case where the first window is covered by the second window, the rendering quality of the first window can be decreased based on the coverage situation, thereby automatically adjusting the rendering quality of the first window for reducing the power consumption of the device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the technical solutions clearly and completely in conjunction with the drawings in the embodiments of the present invention, and it is obvious that the described embodiments are only a part of the embodiments of the present invention instead of all of the embodiments. Based on the embodiments in this invention, all other embodiments obtained by a person of ordinary skill in the art without making creativity are within the scope of protection of this invention. Further, unless otherwise indicated (e.g., “or additionally” or “or in the alternative”), the term “or” as used herein refers to the non-exclusive “or” (i.e., “and/or”). Moreover, the various embodiments described herein are not necessarily mutually exclusive, as some embodiments may be combined with one or more other embodiments to form new embodiments.

In an example, desktop dynamic wallpaper/game/camera effects preview/video effects playback and other scenarios under the drop-down menu bar. The drop-down menu becomes the only screen that can be seen at this time. The high-performance or special effects content of dynamic wallpaper/game/camera/video is high-quality rendering, which will waste power consumption.

In another example, a single-screen game and video playback are being used, if the video playback window is larger than a certain percentage of the screen area (e.g., 50%), and the video playback content is the user’s attention screen, then the game maintains high frames and special effects with high quality that will waste power consumption.

Based on this, the present invention provides a rendering method which, in cases where at least part of a region of a first window is covered by a second window. Whether or not to lower the rendering quality of the first window is determined based on coordinates and/or an area of the region of the first window which is covered by the second window. The first window is rendered in the lowered rendering quality while determining the lowering of the rendering quality of the first window, such that in the case where the first window is covered by the second window, it is possible to reduce the rendering quality of the first window based on the coverage situation, thereby reducing the power consumption of a device.

It could be understood that in the above example, the first window is the window in which the dynamic wallpaper/game/camera effects preview/video effects playback, etc. is covered, and the second window is the window in which the drop-down menus and videos, pop-ups, or images, etc. described above are presented in the upper layer.

Figure 1:
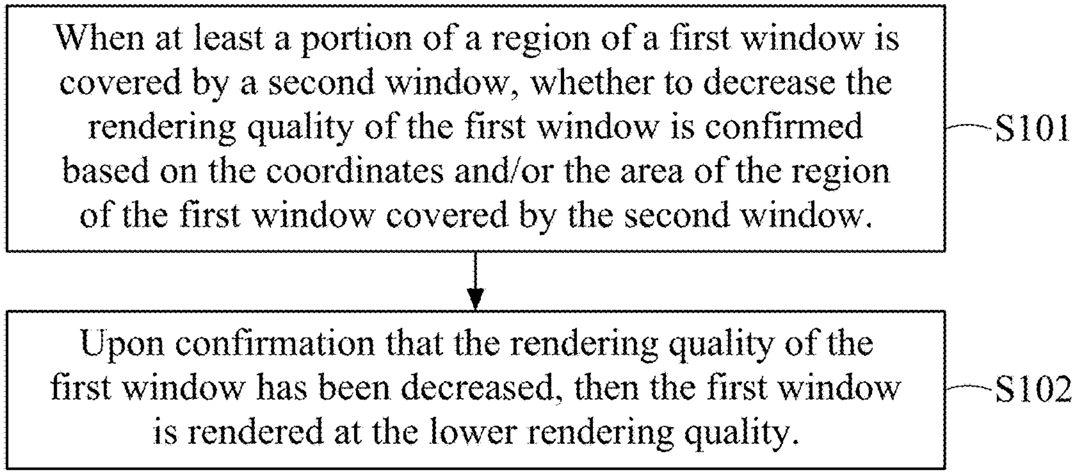
FIG. 1 is a flowchart of an embodiment of a rendering method of the present invention.

As shown in FIG. 1, the rendering method of the present invention comprises the following steps. It should be noted that the following step numbers are only used to simplify the description and are not intended to limit the order of execution of the steps. The steps of the present embodiment may be replaced in any order of execution without violating the technical ideas of the present invention.

Step S101: when at least a portion of a region of a first window is covered by a second window, whether to decrease the rendering quality of the first window is confirmed based on the coordinates and/or the area of the region of the first window covered by the second window.

In the case where at least a portion of the region of the first window is covered by the second window, whether the rendering quality of the first window needs to be decreased may be determined based on the coordinates and/or the area of the region of the first window that is covered by the second window. When it is necessary to decrease the rendering quality of the first window, the first window would be rendered at the lowered rendering quality, otherwise the first window would be rendered at the current rendering quality.

In an implementable way, a need to decrease the rendering quality of the first window may be determined based on the coordinates of the region of the first window being covered by the second window. Optionally, when it is confirmed that the region is an important region based on the coordinates of the region of the first window being covered by the second window, it is determined that the rendering quality of the first window is to be decreased. When it is determined that the region is a non-important region based on the coordinates of the region of the first window being covered by the second window, then confirm not to decrease the rendering quality of the first window. For example, when it is determined that the covered region is located in an edge region of the first window based on the coordinates of the region covered by the second window, the covered region may be considered to be a non-important region of the first window. When it is determined that the covered region is located in a central region of the first window based on the coordinates of the region covered by the second window, the covered region may be considered to be an important region of the first window. In another example, when it is determined that the covered region based on its coordinates being covered is a region such as a title bar, a menu bar, a toolbar, a status bar, and/or a scroll bar of the first window, the covered region may be considered to be a non-important region of the first window. When it is determined that the covered region based on its coordinates being covered is a working region of the first window, the covered region may be considered to be an important region of the first window, wherein the working region of the first window may be set according to the actual situation, and it is not limited herein. For example, the first window is a video playback window, and the working region of the first window may be a video playback region in the first window. For another example, the first window is a chat window, and the working region of the first window may be an input region and at least a portion of the chat record display region adjacent to the input region.

In another implementable way, the need to decrease the rendering quality of the first window may be determined based on the area of the region of the first window covered by the second window.

Optionally, when the area of the covered region is greater than a first threshold, it can be determined to decrease the rendering quality of the first window. When the area of the covered region is smaller than the first threshold, it can be determined not to decrease the rendering quality of the first window. It could be understood that when the area of the covered region is equal to the first threshold, the rendering quality of the first window may be decreased, or also the rendering quality of the first window may not be decreased, no limitation is made herein.

In other embodiments, it is also possible to confirm whether to decrease the rendering quality of the first window based on the ratio of the area of the covered region to the total area of the first window. Specifically, when the ratio of the area of the covered region to the total area of the first window is greater than a second threshold, it is determined that the rendering quality of the first window may be decreased. When the ratio of the area of the covered region to the total area of the first window is less than the second threshold, it is determined that the rendering quality of the first window may not be decreased. It could be understood that when the ratio of the area of the covered region to the total area of the first window is equal to the second threshold, the rendering quality of the first window may be decreased, or also the rendering quality of the first window may not be decreased, no limitation is made herein.

In yet another implementable way, the coordinates and/or the area of the covered region of the first window covered by the second window may be used to confirm whether to decrease the rendering quality of the first window.

In an embodiment, when it is confirmed that the covered region is an important region of the first window, and the area of the covered region is large based on the coordinates of the covered region, then could confirm that the rendering quality of the first window may be decreased. When it is confirmed that the covered region is a non-important region of the first window, or the area of the covered region is small based on the coordinates of the covered region, then could confirm that the rendering quality of the first window may not be decreased. It will be appreciated that the larger area of the covered region may include: the area of the covered region is larger than the first threshold, and the ratio of the area of the covered region to the total area of the first window is larger than the second threshold. Accordingly, the smaller area of the covered region may include: the area of the covered region is smaller than the first threshold, and the ratio of the area of the covered region to the total area of the first window is smaller than the second threshold.

In another embodiment, when it is confirmed that the covered region is an important region of the first window, or the area of the covered region is larger based on the coordinates of the covered region, then could confirm that the rendering quality of the first window may be decreased. When it is confirmed that the covered region is a non-important region of the first window, and the area of the covered region is smaller based on the coordinates of the covered region, then could confirm that the rendering quality of the first window may not be decreased.

In yet another embodiment, it is determined that the rendering quality of the first window is to be decreased when it is determined that the area of the important region of the first window covered by the second window is greater than a third threshold based on the coordinates and/or the area of the covered region, or when it is determined that the ratio of the area of the important region of the first window covered by the second window to the total area of the important region of the first window is greater than a fourth threshold. Otherwise, it is determined not to decrease the rendering quality of the first window.

It will be appreciated that the first window may be covered by one or more second windows, no limitation is made herein. In cases where the first window is covered by a plurality of second windows, a confirmation may be made as to whether to decrease the rendering quality of the first window based on the coordinates and/or the area of the first window covered by the second windows. For example, a confirmation may be made as to whether at least one of the second windows covers an important region of the first window based on the coordinates of the first window being covered by the second windows. Decreasing the rendering quality of the first window may be determined when at least one of the second windows covers the important region of the first window. Otherwise, it is determined that the rendering quality of the first window is not to be decreased. In another example, in cases where the first window is covered by a plurality of second windows, decreasing the rendering quality of the first window is determined based on the total area of the first window covered by the plurality of second windows.

The first threshold, second threshold, third threshold, and fourth threshold described above may be set according to the actual situation, and is not limited herein, wherein the first threshold, the second threshold, the third threshold, and the fourth threshold corresponding to different windows may be different or the same, and there is no restriction herein. In addition, the first threshold, the second threshold, the third threshold, and the fourth threshold corresponding to different windows of each application may be different or the same.

In a further implementation, when at least a portion of the region of the first window is covered by the second window, it may be possible to confirm whether to decrease the rendering quality of the first window based on the window behavior of the first window, the second window, or both. The window behavior may comprise a call prompt, a play prompt, or a click action, etc.

In an embodiment, when at least part of the region of the first window is covered by the second window, it is possible to confirm whether to decrease the rendering quality of the first window based on the window behavior of the second window.

In a specific example, when it is confirmed that the second window has the above window behavior, it may be considered that the user's focus falls on the second window, so that the rendering quality of the first window may be decreased. When it is confirmed that the second window does not have the above window behavior, the rendering quality of the first window may not be decreased. For example, when the second window has a voice call, video playback, or clicking on the front window operation (e.g., a click frequency greater than 10 times/min) and other behaviors, it can be determined that the user's attention falls on the second window, in which case the rendering quality of the first window can be decreased.

In another specific example, upon confirming the existence of the above window behavior in the second window, it can be assumed that the user's focus of attention falls on the second window. In order to improve the display effect of the device, it can be further determined whether or not to decrease the rendering quality of the first window based on the coordinates and/or the area of the region of the first window being covered by the second window. The specific implementation process of determining whether or not to decrease the rendering quality of the first window based on the coordinates and/or the area of the region of the first window being covered by the second window can refer to the above implementations, will not be repeated herein. In this embodiment, when it is confirmed that the second window does not have the above window behavior, it may be directly determined not to decrease the rendering quality of the first window. Alternatively, when it is confirmed that the second window does not have the above window behavior, but could not confirm whether the user's focus falls on the second window, at this time it is also possible to confirm whether to decrease the rendering quality of the first window based on the coordinates and/or the area of the region of the first window covered by the second window. Further, in this case, the judgment criteria (i.e., the first threshold, second threshold, third threshold, and fourth threshold described above) for the area of the second window when the second window does not have the above window behavior may be larger than the judgment criteria for the area of the second window when the second window has the above window behavior. In other words, when it is not possible to confirm whether or not the user's focus falls on the second window, the area of the region of the first window being covered by the second window exceeds a larger threshold can be determined to decrease the rendering quality of the first window. When it is determined that the user's focus falls on the second window based on the window behavior, the area of the region of the first window covered by the second window exceeds a smaller threshold can be determined to decrease the rendering quality of the first window.

In yet another specific example, when confirming that the second window does not have the above window behavior, it may not be possible to determine whether the user's focus is on the second window. At this time, it may also be possible to confirm whether or not to decrease the rendering quality of the first window based on the coordinates and/or the area of the region of the first window being covered by the second window. The specific implementation process of determining whether or not to decrease the rendering quality of the first window based on the coordinates and/or the area of the region of the first window covered by the second window may refer to the above implementations, and thus will not be repeated herein. In this embodiment, upon confirming the existence of the above window behavior of the second window, it can be directly determined to decrease the rendering quality of the first window. Alternatively, when confirming the existence of the above window behavior of the second window, it is also possible to confirm whether or not to decrease the rendering quality of the first window based on the coordinates and/or the area of the region of the first window covered by the second window.

In another embodiment, when at least part of the region of the first window is covered by the second window, it is possible to confirm whether to decrease the rendering quality of the first window based on the window behavior of the first window.

In a specific example, when it is confirmed that the above window behavior is evident in the first window, it can be assumed that the focus of the user falls on the first window. At this time, the rendering quality of the first window may not be decreased. When it is confirmed that the above window behavior does not exist in the first window, it can be determined whether to decrease the rendering quality of the first window based on the situation in which the first window is covered by the second window. For example, based on the coordinates and/or the area of the region in which the first window is covered by the second window, whether the rendering quality of the first window to be decreased or not is determined.

Step S102: upon confirmation that the rendering quality of the first window has been decreased, then the first window is rendered at the lower rendering quality.

When it is determined that the rendering quality of the first window is to be decreased based on step S101, then the first window may be rendered at the lower rendering quality.

Optionally, the rendering quality may include at least one rendering metrics as well as display parameters and the like. The at least one rendering metric may include a number of samples per pixel, a number of ray rebounds, a number of triangular facets for object modeling, a number of vertices, and screen noise and the like. The display parameter may include a frame rate (frames per second, FPS) and a coloring quality, etc. The higher the display parameters, the better the user experience.

Optionally, in order to facilitate adjustment of the rendering quality, a plurality of levels may be set for the rendering quality, such as setting three rendering quality levels, namely, a high level, a medium level, and a low level, and setting the rendering metrics and the display parameters corresponding to each level, etc.

In an embodiment, the rendering quality of the relatively high level is higher than the rendering quality of the relatively low level. In this way, in step S102, the rendering quality may be adjusted by lowering down the rendering quality by at least one level on the current rendering quality level, and then rendering the first window at the rendering quality corresponding to the lowered rendering quality level.

When it is determined that the rendering quality of the first window is to be decreased and there is no special effects rendering in the first window, the current rendering quality level may be reduced by the first number of levels. When there is special effects rendering in the first window, the current rendering quality level may be reduced by the second number of levels, wherein the second number is greater than the first number. The first number and the second number may be set according to the actual situation and are not limited herein. For example, the first number may be 1 and the second number may be 2. In another embodiment, when it is determined that the rendering quality of the first window is decreased, the first number of levels may be lowered on the current rendering quality level regardless of whether special effects rendering exists in the first window. In yet another embodiment, when it is determined that the rendering quality of the first window is decreased, regardless of whether special effects rendering exists in the first window, the first number of levels may be lowered on the current rendering quality level, and in the case where special effects rendering exists in the first window, the special effects rendering can be further turned off.

In another embodiment, the rendering quality of the relatively high level is lower than the rendering quality of the relatively low level. At this time, the rendering quality level may also be referred to as the “ignoring level”. In this way, in step S102, the rendering quality may be decreased by increasing the current rendering quality level by at least a level, and then rendering the first window at the rendering quality that corresponds to the increased rendering quality level.

In the confirmed cases where the rendering quality of the first window is decreased, the first window may be rendered at the lower rendering quality.

Optionally, the entire region of the first window may be rendered at the lower rendering quality.

Alternatively, the region of the first window that is covered by the second window may be rendered at the lower rendering quality. The region of the first window that is not covered by the second window may be rendered at a pre-lowered rendering quality. For example, assuming that the rendering quality of the relatively high level is lower than the rendering quality of the relatively low level. The current rendering quality level of the first window is low. Since the second window covering the first window and the state of coverage of the first window determines that the rendering quality of the first window needs to be decreased, then the rendering quality of the first window may be rendered at a rendering quality that corresponds to the medium level for the region of the first window covered by the second window. The first window may be rendered at a rendering quality that corresponds to the low level for the region of the first window not covered by the second window.

Further, in cases where special effects rendering exists in the first window, when it is determined that the rendering quality of the first window needs to be decreased, the special effects rendering of all the region of the first window may be turned off while at least part of the region of the first window is being rendered at the lower rendering quality. Alternately, only the special effects rendering of the region of the first window that is covered by the second window may be turned off, i.e. the region of the first window that is not covered by the second window special effects rendering may or may not be turned off.

In this embodiment, in cases where at least a portion of the region of the first window is covered by the second window whether or not to lower the rendering quality of the first window is determined based on the coordinates and/or the area of the region of the first window that is covered by the second window. When it is determined that the rendering quality of the first window is to be lowered, the first window is rendered at the lower rendering quality, so that in cases where the first window is covered by the second window, it is possible to lower the rendering quality of the first window based on the coverage situation, thereby reducing the power consumption of the device.

Optionally, a device may include a main controller. An application may run on the device. In the rendering method of the present invention, the step of determining whether to decrease the rendering quality of the first window based on the coordinates and/or the area of the region of the first window covered by the second window may be performed by the application and/or the main controller corresponding to the first window; perform the step of rendering the first window at the lower rendering quality when it is determined that the rendering quality of the first window is decreased.

Wherein the application corresponding to the first window is an application that provides the first window to display the data.

In a first specific example, the first window and the second window may be determined by a main controller. The main controller also determines whether or not to decrease the rendering quality of the first window based on the coordinates and/or the area of the region of the first window covered by the second window. Namely the main controller determines the rendering quality of the first window based on the coordinates and/or the area of the region of the first window covered by the second window. Then, the main controller informs the application corresponding to the first window of the determined rendering quality of the first window to allow the application corresponding to the first window to render the region of the first window covered by the second window or all of the region of the first window based on the determined rendering quality of the first window. Namely based on the determined rendering quality of the first window, the application corresponding to the first window to render a to-be-displayed content corresponding to the region of the first window covered by the second window or all of the region of the first window. Then, the application corresponding to the first window sends the rendered to-be-displayed content to a frame register to allow the main controller to present the corresponding content in the first window based on the to-be-displayed content of the first window in the frame register.

In a second specific example, the first window and the second window may be determined by the main controller. The main controller also determines whether to decrease the rendering quality of the first window based on the coordinates and/or the area of the region of the first window covered by the second window. Namely, the main controller may confirm the rendering quality level of the first window based on the coordinates and/or the area of the region of the first window covered by the second window. Then the main controller informs the application corresponding to the first window of the determined rendering quality level of the first window to allow the application corresponding to the first window to render the region of the first window covered by the second window or the entire region of the first window based on the rendering quality corresponding to the determined rendering quality level of the first window. Namely, based on the determined rendering quality of the first window to render the to-be-displayed content corresponding to the region of the first window covered by the second window or the entire region of the first window. The application corresponding to the first window then sends the rendered to-be-displayed content to the frame register to allow the main controller to present the corresponding content in the first window based on the to-be-displayed content of the first window in the frame register.

In a third specific example, the first window and the second window may be determined by the main controller. The main controller also determines whether or not to decrease the rendering quality of the first window based on the coordinates and/or the area of the region of the first window covered by the second window. The main controller may confirm the rendering quality level of the first window based on the coordinates and/or the area of the region of the first window covered by the second window. Then the main controller informs the application corresponding to the first window of the determined rendering quality level of the first window to allow the application corresponding to the first window to confirm the rendering quality of the first window based on the determined rendering quality level of the first window. The application corresponding to the first window informs the main controller of the rendering quality of the first window to allow the main controller to render the region of the first window covered by the second window or the entire region of the first window based on the informed rendering quality of the first window. Namely, to render the to-be-displayed content corresponding to the region of the first window covered by the second window or the entire region of the first window based on the determined rendering quality of the first window. Then the main controller presents the corresponding content in the first window based on the rendered to-be-displayed content of the first window.

In a fourth specific example, the first window and the second window may be determined by the main controller. The main controller also determines whether the rendering quality of the first window is decreased based on the coordinates and/or the area of the region of the first window covered by the second window. Namely, the main controller may confirm the rendering quality level of the first window based on the coordinates and/or the area of the region of the first window covered by the second window. Then, the main controller informs the application corresponding to the first window of the determined rendering quality level of the first window to allow the application corresponding to the first window to confirm the rendering quality of the first window based on the determined rendering quality level of the first window. It may allow the application corresponding to the first window to render the region covered by the second window or all of the region of the first window based on the rendering quality corresponding to the determined rendering quality level of the first window, and then the application corresponding to the first window sends the rendered to-be-displayed content to the frame register. The application corresponding to the first window may inform the main controller of at least a portion of the rendering quality of the first window to allow the main controller to process the to-be-displayed content of the first window in the frame register based on at least a portion of the informed rendering quality of the first window. For example, the main controller may render the region of the first window covered by the second window or the entire region of the first window based on at least a portion of the informed rendering quality of the first window. Then the main controller presents the corresponding content in the first window based on the rendered to-be-displayed content of the first window. In this specific example, both the application corresponding to the first window and the main controller may render the to-be-displayed content of the first window. They may render the to-be-displayed content of the first window based on the adjusted rendering quality according to the coordinates and/or the area of the covered region and other relevant circumstances.

In a fifth specific example, the first window and the second window may be determined by the main controller. The main controller also determines whether the rendering quality of the first window is decreased based on the coordinates and/or the area of the region of the first window covered by the second window. Namely, the main controller may confirm the rendering quality level of the first window based on the coordinates and/or the area of the region of the first window covered by the second window. Then, the main controller informs the application corresponding to the first window of the determined rendering quality level of the first window to allow the application corresponding to the first window to confirm the rendering quality of the first window based on the determined rendering quality level of the first window. It may allow the application corresponding to the first window to render the region of the first window covered by the second window or the entire region of the first window based on the rendering quality corresponding to the determined rendering quality level of the first window. Then the application corresponding to the first window sends the rendered to-be-displayed content to the frame register. The main controller may also confirm the rendering quality of the first window based on the determined rendering quality level of the first window, so that after the application corresponding to the first window sends the rendered to-be-displayed content to the frame register. The main controller may process the to-be-displayed content of the first window in the frame register based on the determined rendering quality of the first window by itself. For example, the main controller may render the region of the first window covered by the second window or the entire region of the first window based on the determined rendering quality of the first window by itself, and then the main controller presents the corresponding content in the first window based on the rendered to-be-displayed content of the first window. In this specific example, both the application corresponding to the first window and the main controller may render the to-be-displayed content of the first window, and may render the to-be-displayed content of the first window based on the adjusted rendering quality according to the coordinates and/or the area of the covered region and other relevant circumstances. However, unlike the fourth specific example, the relevant quality requirements for the main controller's rendering processing are determined by the main controller itself. The application corresponding to the first window may confirm the relevant quality requirements for its own rendering processing based on the rendering quality level, and the main controller may also confirm the relevant quality requirements for its own rendering processing based on the rendering quality level, so that the step of informing about the rendering quality can be dispensed with.

Figure 2:
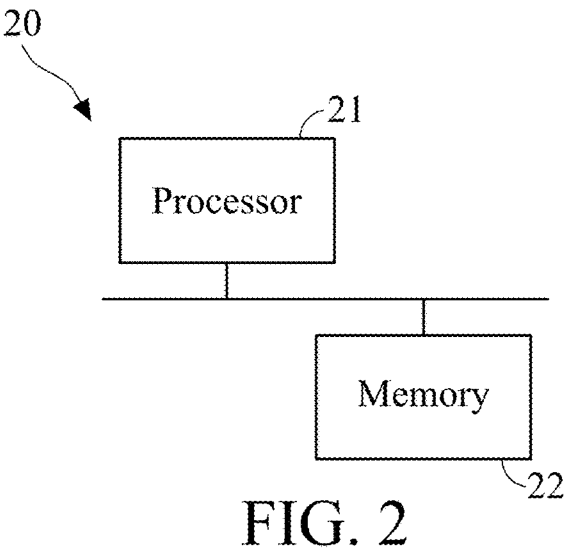
FIG. 2 is a schematic diagram of the structure of an embodiment of an electronic device of the present invention.

Referring to FIG. 2, FIG. 2 is a schematic diagram of the structure of an embodiment of an electronic device of the present invention. The electronic device 20 includes a processor 22, and the processor 22 is used to execute instructions to implement the rendering method described above. Please refer to the description of the above embodiment for the specific implementation process, which will not be repeated herein.

The processor 22 may also be referred to as a CPU (Central Processing Unit). The processor 22 may be an integrated circuit chip with signal processing capabilities. The processor 22 may also be a general processor, a digital signal processor (DSP), an application-specific integrated circuit (ASIC), a field-programmable gate array (FPGA) or other programmable logic device, a discrete gate or transistor logic device, a discrete hardware component. The general processor may be a microprocessor or the processor 22 may also be any conventional processor, etc.

The electronic device 20 may further include a memory 21 for storing instructions and data necessary for the operation of the processor 22.

The processor 22 is used to execute instructions to implement the method provided by any of the embodiments of the rendering method of the present invention described above and any non-conflicting combinations thereof.

Figure 3:
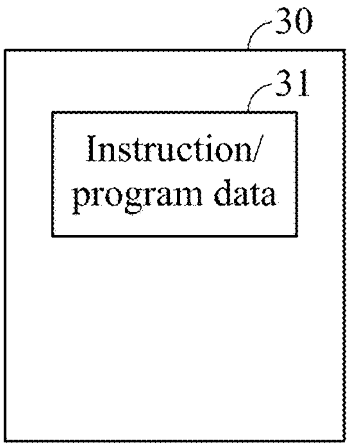
FIG. 3 is a schematic diagram of the structure of an embodiment of a computer-readable storage medium of the present invention.

Referring to FIG. 3, FIG. 3 shows a schematic diagram of the structure of a computer-readable storage medium of an embodiment of the present invention. The computer-readable storage medium 30 of the embodiment of the present invention stores an instruction/program data 31 which, when executed, implements the method provided by any embodiment of the rendering method of the present invention and any non-conflicting combination thereof. The instruction/program data 31 may form a program file and be stored in the computer-readable storage medium 30 in the form of a software product to cause a computer device (which may be a personal computer, a server, or a network device, etc.) or a processor to perform all or some of the steps of the method of each embodiment of the present invention. The computer-readable storage medium 30 includes: a USB, a mobile hard disk, a read-only memory (ROM), a random access memory (RAM), a disk or a CD-ROM, and other kinds of media that can store program code, or a terminal device such as a computer, a server, a cell phone, a tablet, and the like.

In the several embodiments provided in this invention, it should be understood that the systems, devices and methods disclosed, may be realized in other ways. For example, the device embodiments described above are merely schematic, e.g., the division of units, which is merely a logical functional division, may be divided in other ways when actually implemented, e.g., multiple units or components may be combined or may be integrated into another system, or some features may be ignored, or not implemented. Another point is that the mutual coupling or direct coupling or communication connection shown or discussed may be indirect coupling or communication connection through some interface, device or unit, which may be electrical, mechanical or other forms.

In addition, each functional unit in various embodiments of the present invention may be integrated in a processing unit, or physically each unit may exist separately, or two or more units may be integrated in a single unit. The above integrated units may be realized either in the form of hardware or in the form of software functional units.

It should also be noted that the terms "including", "comprising", or any other variant thereof, are intended to cover non-exclusive inclusion, so that a process, method, commodity or equipment comprising a set of elements includes not only those elements but also other elements that are not expressly listed or that are inherent to such process, method, commodity or equipment. Without further limitation, the fact that an element is defined by the phrase "includes a . . . " does not exclude the existence of additional identical elements in the process, method, commodity or apparatus in which the element is included.

The above is only the implementation of this invention, not to limit the patent scope of this invention, where the use of this invention specification and the accompanying drawings of the equivalent structure or equivalent process transformation, or directly or indirectly used in other related fields of technology, are similarly included in the scope of patent protection of this invention.

What is claimed is:

1. A rendering method, comprising:

determining whether to decrease a rendering quality of a first window based on coordinates and/or area of a region of the first window being covered by a second window, when at least a portion of the region of the first window is covered by the second window; and in response to at least the portion of the region of the first window being covered by the second window and the rendering quality of the first window being determined to decrease, rendering the first window at a lower rendering quality.

2. The method as claimed in claim 1, wherein the operation of determining whether to decrease the rendering quality of the first window based on the coordinates and/or the area of the region of the first window covered by the second window comprises:

determining whether the region being covered is an important region of the first window based on the coordinates of the region being covered; and determining to decrease the rendering quality of the first window, when the region being covered is an important region of the first window.

3. A rendering method, comprising:

determining whether to decrease a rendering quality of a first window based on coordinates and/or area of a region of the first window being covered by a second window, when at least a portion of the region of the first window is covered by the second window; and rendering the first window at a lower rendering quality upon confirmation that the rendering quality of the first window has been decreased wherein the operation of determining whether to decrease the rendering quality of the first window based on the coordinates and/or the area of the region of the first window covered by the second window comprises:

determining whether the area of the region being covered is greater than a first threshold, wherein when the area of the region being covered is greater than the first threshold, it is determined that the rendering quality of the first window is to be decreased; or determining whether a ratio of the area of the region being covered to a total area of the first window is greater than a second threshold based on the coordinates of the region being covered, wherein when the ratio is greater than the second threshold, it is determined that the rendering quality of the first window is to be decreased.

4. The method as claimed in claim 1, wherein the operation of rendering the first window at the lower rendering quality comprises:

rendering the region being covered at the lower rendering quality; and rendering the region of the first window not being covered by the second window at a pre-lowered rendering quality.

5. The method as claimed in claim 1, wherein the operation of rendering the first window at the lower rendering quality comprises:

turning off special effects rendering of the region being covered based on the coordinates of the region being covered when the first window uses special effects rendering.

6. The method as claimed in claim 1, wherein the rendering method is applied to a device, the device comprises a main controller and runs an application, and the operation of determining whether to decrease the rendering quality of the first window based on the coordinates and/or the area of the region of the first window covered by the second window when at least the portion of the region of the first window is covered by the second window comprises:

the main controller or the application corresponding to the first window determines whether to decrease the rendering quality of the first window based on the coordinates and/or the area of the region of the first window covered by the second window; and the operation of rendering the first window at the lower rendering quality upon confirmation that the rendering quality of the first window has been decreased comprises:

the main controller and/or the application corresponding to the first window renders the first window at the lower rendering quality upon confirmation that the rendering quality of the first window has been decreased.

7. The method as claimed in claim 6, wherein the rendering quality of the first window is divided into a plurality of levels, and the operation of determining whether to decrease the rendering quality of the first window based on the coordinates and/or the area of the region of the first window covered by the second window when at least the portion of the region of the first window is covered by the second window comprises:

the main controller determines whether to decrease the rendering quality of the first window based on the coordinates and/or the area of the region of the first window covered by the second window when at least the portion of the region of the first window is covered by the second window;

wherein the operation of rendering the first window at the lower rendering quality upon confirmation that the rendering quality of the first window has been decreased comprises:

the main controller adjusts the rendering quality based on a current rendering quality level of the first window upon confirmation that the rendering quality of the first window has been decreased, wherein the rendering quality corresponding to an adjusted level is lower than the rendering quality corresponding to an unadjusted level;

the main controller informs the application corresponding to the first window of the adjusted level;

the application corresponding to the first window determines the rendering quality corresponding to the adjusted level and feeds it back to the main controller; and the main controller renders a to-be-displayed content in the first window using the rendering quality corresponding to the adjusted level.

8. The method as claimed in claim 1, wherein the rendering quality of the first window is divided into the plurality of levels; and wherein, in the operation of rendering the first window at the lower rendering quality upon confirmation that the rendering quality of the first window has been decreased, the rendering quality corresponding to a first level is higher than the rendering quality corresponding to a second level, wherein the second level is higher than the first level, and when it is determined that the rendering quality of the first window is decreased, at least one level is raised on the current rendering quality level of the first window to render the first window at the rendering quality corresponding to a raised level.

9. The method as claimed in claim 1, wherein it is determined whether to decrease the rendering quality of the first window based on window behavior of the second window when at least a portion of the region of the first window is covered by the second window, wherein the window behavior comprises call prompt, playback prompt or click action.

10. An electronic device, comprising:

a memory, configured to store instructions/program data; and a processor, coupled to the memory and configured to execute the instructions/program data to implement steps of the rendering method of claim 1.

11. A non-transitory computer-readable storage medium comprising instructions/program data that, when executed, carries out the steps of the rendering method set forth in claim 1.

12. The method as claimed in claim 1, wherein the rendering quality of the second window is not changed with the rendering quality change of the first window.

* * * * *